United States Patent [19]

Cheng

[11] 4,353,713

[45] Oct. 12, 1982

[54] INTEGRATED GASIFICATION PROCESS

[76] Inventor: Shang-I Cheng, 17 Woodland Dr., Matawan, N.J. 07747

[21] Appl. No.: 173,169

[22] Filed: Jul. 28, 1980

[51] Int. Cl.³ .............................................. C10J 3/12
[52] U.S. Cl. .................................. 48/202; 48/197 A; 48/209; 201/2.5; 252/373
[58] Field of Search ...................... 48/202, 197 A, 209; 252/373; 201/2.5

[56] References Cited

U.S. PATENT DOCUMENTS

| 2,807,529 | 9/1957 | Tarbox ................................. 48/202 |
| 3,812,620 | 5/1974 | Titus .................................... 48/209 |
| 4,231,760 | 11/1980 | Lancet et al. ........................ 48/202 |

Primary Examiner—Peter F. Kratz
Attorney, Agent, or Firm—Karl F. Ross

[57] ABSTRACT

An integrated process for the gasification of coal alone or with other carbon-containing materials such as solid municipal wastes, biomass and sewage sludges, wherein the endothermic heat required by the gasification reaction is supplied at least in a significant part by the exothermic reaction of CaO in the form of calcined lime or dolomite with carbon dioxide. The $CO_2$ is recycled to provide a high $CO_2$ vapor pressure for the exothermic reaction. The calcium carbonate formed in the reaction is decomposed in a combustor to produce the CaO which is recycled to the gasification stage.

7 Claims, 2 Drawing Figures

INTEGRATED GASIFICATION PROCESS

FIELD OF THE INVENTION

My present invention relates to a process for the gasification of carbonaceous materials and, more particularly, to an integrated gasification process which can utilize as a gasifiable starting material, coal and municipal solid wastes, biomass and/or sludges produced in the treatment of sewage.

BACKGROUND OF THE INVENTION

With the declining availability of energy sources and increasing concern for environmental contamination by municipal solid waste (MSW) and sewage-treatment sludges, a number of proposals have been made which will, on the one hand be capable of converting MSW to useful energy and, on the other hand, destroying or eliminating the sludge disposal problem.

It has long been recognized, in addition, that the only long-term economically available energy source currently exploitable in the United States is coal which can be utilized with great effectiveness upon gasification.

It should also be noted that incineration of sludge and MSW produces atmospheric pollutants and hence this technique is not a solution to environmental problems.

In practice it has been found that coal gasification, being an endothermic process, is frequently uneconomical and that conventional techniques for the gasification of MSW and sludge, likewise are unsatisfactory.

OBJECTS OF THE INVENTION

It is the principal object of my present invention to provide an improved method of gasifying carbon-containing materials whereby the disadvantages of prior art systems can be obviated.

It is another object of this invention to provide an improved process for the gasification of coal which is more economical than earlier systems and, at the same time, can eliminate potential environmental hazards from the disposal of municipal solid waste and sewage-treatment sludge.

It is also an object of my invention to provide an improved process for the elimination of municipal solid wastes and sewage treatment sludge so as to obtain optimum utilization of both the energy content and the recoverable components thereof.

SUMMARY OF THE INVENTION

These objects and others which will become apparent hereinafter are attained, in accordance with the present invention, in a process which is based upon the contribution to the gasification step of the exothermic reaction $CaO + CO_2 = CaCO_3$.

As will be developed hereinafter, it has already been proposed to provide a $CO_2$ acceptor process in which, however, the drying of coal prior to gasification and the using of $CO_2$ merely from the pyrolysis of coal which results in not generating enough heat to support extensive char-steam reactions rendered this system uneconomical.

I have now found that large quantities of heat can be generated in the gasifier or during a gasifying stage by recovering carbon dioxide from the flue gases and product gases, and feeding this carbon dioxide back (i.e. recycling it) to the gasifier to raise the partial pressure therein at the point at which the carbon dioxide reacts with the CaO, in the form of calcined lime or dolomite, in the exothermic reaction described above.

Surprisingly, municipal solid waste (MSW) and coal can be jointly gasified with the heat contributed by this exothermic reaction (using $CO_2$ produced by pyrolysis of MSW and combustion of coal) with considerable efficiency to produce a gas mixture capable of separation as described below and char which can be induced to undergo a water reaction downstream from the initial gasifier phase and preferably in the same unit of the installation, this second gasification phase using heat contributed by the exothermic reaction between recycled $CO_2$ and CaO.

According to the invention, the water for the water gas reaction is preferably supplied by preheated sludge, thereby integrating coal gasification and disposal of MSW and sludge into an energetically efficient process which is capable of producing economically valuable substances such as synthetic or combustible gases (fuel gases), carbon dioxide and reusable municipal waste residues such as molten aluminum.

Naturally, it is not always essential to utilize MSW as a carbon-containing substance in addition to coal or even to use sewage-treatment sludge as a water carrier if the water contribution is supplied from some other source. However in the preferred operation, the feed to the process will consist of coal and at least one component selected from the group which consists of municipal solid wastes, biomass from fermentation or from growth-producing processes or natural water. Water is always required and will be supplied as moisture in one or more of the aforementioned components, preferably as part of the sludge composition. The $CaO/CaCO_3$, as lime or dolomite, is of course recycled.

According to the broadest principles of the present invention, at least one carbon-containing substance (preferably three carbon-containing components as noted above) is gasified in the presence of CaO at an elevated temperature with at least part of the heat necessary for the gasification deriving from the reaction of CaO with $CO_2$ to form $CaCO_3$, thereby producing a solid residue containing $CaCO_3$ and a gas containing carbon dioxide, hydrogen, carbon monoxide, $H_2O$ and hydrocarbons.

The solid residue of this first stage of the process also includes calcined lime or dolomite which has not yet reacted with carbon dioxide.

It should be noted that the process of devolatilization of coal during the beginning stage of gasification is almost thermal neutral. Under slightly endothermic conditions, the heat required is supplied by the reaction of part of the hot CaO (in the form of recirculated calcined lime or dolomite), and carbon dioxide generated by the devolatilization of the coal.

In the second stage of the reaction, the residual char is reacted with $H_2O$ in a steam-carbon water gas reaction which is highly endothermic, the major part at least of the heat required for this reaction being contributed by the highly exothermic reaction of CaO in the solids with $CO_2$ in the gas at the high $CO_2$ vapor pressure maintained during these first two phases.

During the first stage or phase, organic components in the MSW, where the latter constitutes one of the feeds, are pyrolyzed.

It will be apparent from the foregoing that the second stage of the reaction is again a gasification, namely the gasification of the residual char. The reaction is enabled to occur by supplying a large quantity of heat in the form of carbonization of the lime or dolomite with recycled $CO_2$ being derived from the flue gas and product purification stages as described below.

Since the $H_2O$ generated in the first stage by pyrolysis and devolatilization is not sufficient to sustain the steam/char reaction in the second stage, additional water is supplied. According to an important feature of the invention, the additional water is supplied by wet biomass or sludge and any moisture which may be present in the coal, e.g. by the use of a coal having a high concentration of moisture such as lignite. The biomass and the sludge contribute organic components which likewise undergo gasification by the char/steam reaction, thereby contributing to the gas production and simultaneously disposing of the biomass and the sludge without leaving any significant waste in liquid or solid form.

During the second stage of the reaction, various inorganic residues may be thermally treated in the gasification unit. For example, municipal solid waste may contain aluminum which was not previously removed as were ferrous metals, glass and the like. At the temperatures of the gasification reactor during one or both of the gasification stages, an aluminum melt can form and can be recovered.

The products of the second stage reaction include a solid phase consisting predominantly of calcium carbonate or $CaCO_3.MgO$ or $CaCO_3.MgCO_3$, and a gas phase containing carbon dioxide, carbon monoxide, hydrogen, residual water vapor and hydrocarbons.

According to a feature of the invention, in the third stage, carbon dioxide is removed from the gas produced in the second stage, i.e. the excess carbon dioxide which remains unreacted, and this excess carbon dioxide is at least in part recycled to the second stage to provide the high carbon dioxide vapor pressure therein. This carbon dioxide may be delivered to the first stage wherein only a portion reacts with the CaO, the remainder proceeding to the second stage.

According to an important aspect of the invention, the second stage reaction is only carried out to a point which ensures that some char remains in the solid residue. This solid residue is thus combustible and, in a fourth stage of the system of the present invention, is subjected to combustion in a combustor separate from the gasifier. The combustion in the latter stage is carried out with air and under such circumstances that the heat generated by combustion is in excess of that required for the complete decomposition of the $CaCO_3$ in the solid residue by the reaction: $CaCO_3 = CO_2 + H_2O$. The remaining char is thus fully utilized as fuel for the decomposition reaction of which the products include a hot solid phase consisting of calcined lime or dolomite and a gaseous phase (flue gas) which consists of combustion products and $CO_2$ released by the calcination of the solid residue.

The CaO produced in the combustor is cycled to the first gasification stage and at least a part of the $CO_2$ from the flue gas can be recovered and recycled to the first or second gasification stages to produce the high carbon dioxide vapor pressure in the gasifier.

The product gas of the entire process is the mixture of gas components or the individual components having a fuel value from the second stage gasification, i.e. after removal of carbon dioxide. The product gas can be treated further to yield a mixture which consists almost exclusively of hydrogen, methane and higher hydrocarbons.

According to another feature of the invention, the municipal solid waste, when used as a component of the first or second stage gasification, is subjected to a separation preferably to distinguish between a light component and the remainder of the comminuted mass, the light component being combined with the coal and fed therewith to the first stage gasification. All or part of the MSW fraction can be replaced by agricultural wastes, e.g. cellulosic or other fiber material resulting from cereal production, and from any growth-producing process.

In yet another feature of the invention, the water carrier, e.g. a biomass such as sludge, is preheated in direct heat exchange with flue gases from the combustor and/or the gases produced in the second gasification stage by the reaction of char with steam, preferably prior to the removal of carbon dioxide from these latter gases.

The flue gas may be scrubbed with an absorbent for $CO_2$ and from which the $CO_2$ is desorbed. The gas after absorption of $CO_2$ has been found to be excellent for ammonia synthesis and can be delivered directly to an ammonia synthesis plant while the desorbed $CO_2$ can at least in part be liquefied and utilized for tertiary petroleum recovery, e.g. by injection into partially depleted oil strata to promote recovery therefrom.

One of the principal advantages of the system of the present invention is that it simultaneously eliminates sulfur and sulfur compounds from the gases produced from the coal. Any sulfur or sulfur compounds originally contained in the coal, transformed to $H_2S$ or other sulfur compounds, are captured by the CaO and thereby removed from the gases resulting from the second stage char/steam reaction. According to the invention, the $H_2S$ is recovered, collected and fed to a Claus process.

I have found further that an effective balance of the components fed to the first two stages of the reaction can be maintained to optimize material utilization, energy utilization and recovery of gas. The balance can be expressed by the relationship $$\sum_{i=1}^{n} \Delta Hc(x_i - y_i) = \sum_{i=1}^{n} \Delta Hl\, y_i$$

where
$x_i$ = mole fraction of fixed carbon content for the $i^{th}$ component;
$y_i$ = mole fraction of water content for the $i^{th}$ feed component;
$\Delta Hc$ = heat of combustion of carbon in BTU/lb mole or Kcal/g mole;
$\Delta Hl$ = heat of steam-carbon reaction in BTU/lb mole or Kcal/g mole;
i = stands for an individual feed component, including coal, solid waste, biomass, and sludge;
n = number of components in the feed.

In the case of feed which consists of municipal solid waste, sludge and coal, n=3.

According to another aspect of the invention, the gasification stages are carried out in a single generally horizontal cylindrical gasifier provided with a worm or screw conveyor for advancing the solids through a gasifier from one end to the other, the gasifier being connected to a solid feeder for delivering the solid charge, e.g. a mixture of coal and the light component of municipal solid waste. Naturally, where municipal solid waste is used as part of the gasifier charge, the gasifier can include a tap for molten aluminum. Upstream of the solids feeder, I may provide a coal crusher and conventional means for MSW treatment such as a shredder or other comminutor, a device for removing ferrous metals and the like by magnetic separation, and an air classifier or separator for separating the light fraction from the balance.

According to another feature of the invention, the combustor is likewise a generally cylindrical horizontal vessel with a screw or worm type conveyor for advancing the solids from one end to the other, the outlet end of the gasifier being connected to the inlet end of the combustor by still another conveyor, e.g. a bucket elevator.

Of course, means is provided for recirculating solids and gases in the manner described and/or for separating components of the gases.

BRIEF DESCRIPTION OF THE DRAWING

The above and other objects, features and advantages of the present invention will become more readily apparent from the following description, reference being made to the accompanying drawing in which.

DETAILED DESCRIPTION OF THE INVENTION

Figure 1:
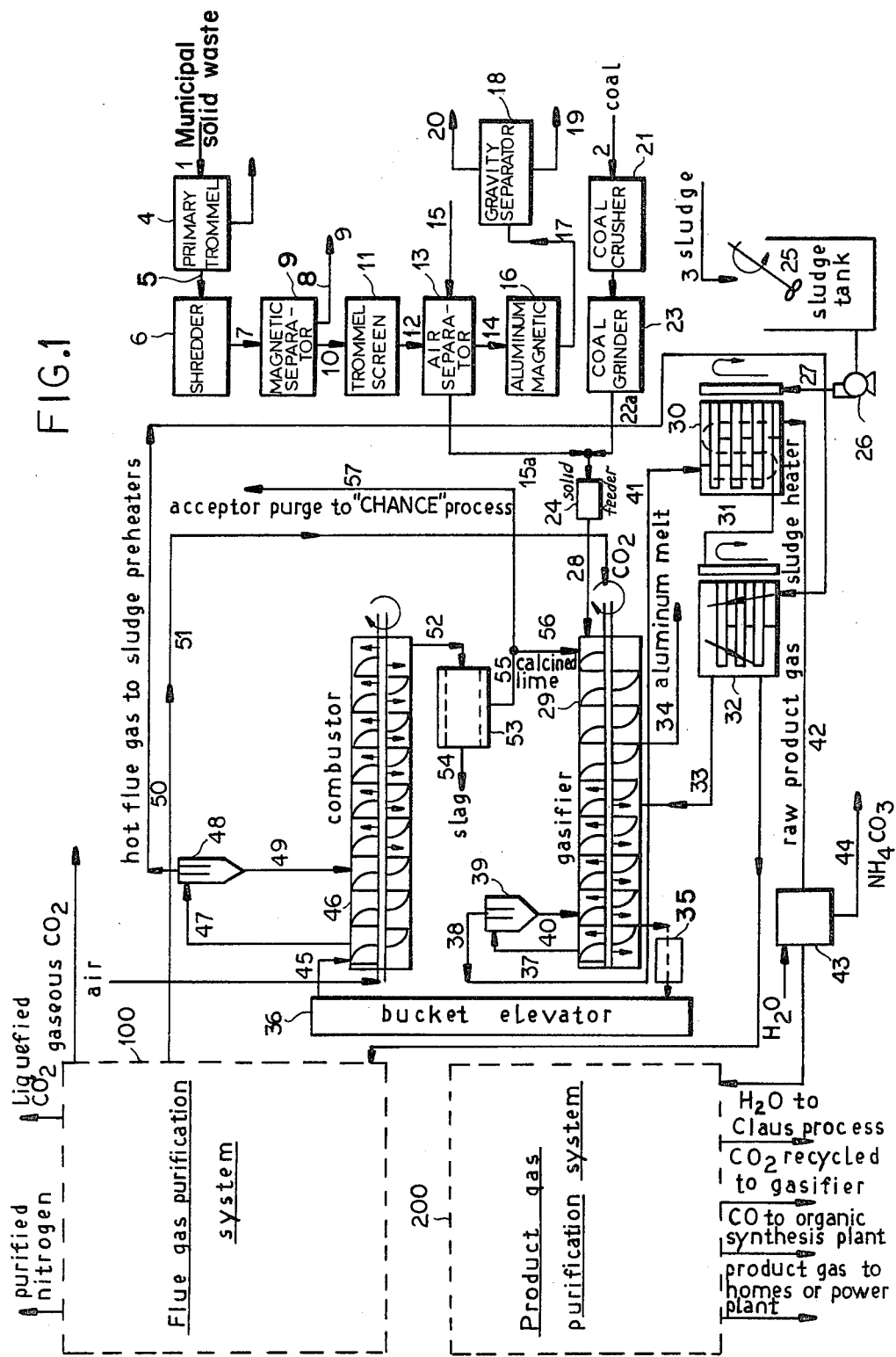
FIG. 1 is a flow diagram of an apparatus for carrying out the method of the invention.

Municipal solid wastes or agricultural wastes indicated by stream 1, are fed into a primary trommel 4 to separate out large and heavy objects and the wastes are then fed via line 5 to a shredder where the garbage is broken into sizes around 1-4 inches.

The shredded waste is fed via line 7 into a magnetic separator 9 where ferrous metals are separated from combustible materials and non-ferrous metals. The ferrous metals are discharged at 8. The combustable materials pass at 10 into the second trommel screen 11 again to separate out heavy objects.

The stream then passes through 12 into an air separator or classifier 13 supplied with air via line 15, where papers and shredded aluminum foils are lifted into stream 15a. Heavier aluminum alloys, non-ferrous metal is removed from residual ferrous metals, rocks and dirt. Stream 17 containing aluminum alloys and non-ferrous metals is fed into a gravity separator 18 to carry out the fractionation into these components which are discharged at 19, 20.

Coal ranging in type from lignite to sub-bituminous, caking or non-caking, is fed at 2 crushed at 21 then ground at 23 into an average size of about ⅛ inch. Final choice of coal particle size should be an optimal balance between rate of gasification and cost of grinding.

The coal stream 22a is combined with the light portion or fraction of municipal waste 15a from the air separator and the mixed stream is fed into the gasifier by a screw-type and pressure-tight solid feeder 24.

The third raw material, sludge 3, from waste-water treatment plants, is pumped at 26 from the sludge tank 25 via line 27 into a heater 30 in which it is preheated by hot product gas and then via line 31 into heater 32 where it is heated by flue gas from the combustor 46. The hot sludge is flushed into the gasifier 29 via line 33.

In the gasifier 29, the coal and solid waste mixture first meets with calcined lime or dolomite.

The coal is devolatilized to give a gas mixture of water vapor, carbon oxide, hydrogen, hydrocarbons and some ammonia and hydrogen sulfide which again reacts with lime or calcined dolomite.

The combustible material from garbage is pyrolyzed to yield a gas mixture which contains about 32% CO, 49% $H_2$, and 9.0% $CH_4$ and 10.0% $C_2$ to $C_4$ hydrocarbons. Pyrolysis and devolatilization are almost thermally neutral; little additional heat is needed.

The heat generated by the reaction between lime or calcined dolomite with the $CO_2$ by pyrolysis and devolatilization supports the vaporization and superheating of the water content of the sludge which contains about 3% solids.

The gasification of residual char takes place in the second part of the gasifier. The large quantity of heat required by char-steam reaction is supplied by carbonization of lime or calcined dolomite with recycling $CO_2$ at high partial pressure. The $CO_2$ gas from flue gas and product purification sections 100, 200 as stream 51 is preheated by flowing through the shaft of a screw-type stirrer-conveyor, then distributed into the near-exit end of the gasifier.

At the temperature of gasification the aluminum foils melt to form dross which agglomerates under the influence of gentle agitation of the stirrer. Metallic aluminum is thus separated from fine particles of char, lime or dolomite and dirt, and it flows as a stream 34 from the gasifier into conventional casting equipment to make ingots.

The product gas stream 37 passes through a set of cyclones 39 to send the solid particles back to the gasifier 29. The remaining gas then goes as stream 38 into the sludge preheater 30 at 41.

Since a very high ratio of Ca/S is maintained in the gasifier, virtually all sulfur from organic sulfur compounds in the coal emerges as $H_2S$ and ends up in the solid phase according to the following chemical reaction:

$$MgO.CaO + H_2S \rightarrow MgO.CaS + H_2O$$

or $$CaO + H_2S \rightarrow CaS + H_2O$$

Some sulfur compounds which are not converted to $H_2S$ in the gasifier will be oxidized to $SO_2$ and retained by CaO or calcined dolomite in the combustor.

The residual char and carbonized lime or dolomite exit from the gasifier into a screw conveyor 35, then into a bucket elevator or air-lift conveyor 36 which discharges them via line 45 into the char combustor 46.

Entering near the flue-gas exit end of the combustor 46, an air stream is preheated by passing through the hollow casing of the stirrer shaft, and enters the combustor 46 near its solids exit end.

The flow rates of char and lime (or dolomite) mixture are so adjusted that the temperature at the exit end is high enough so that a slag can agglomerate for its easy separation from the calcined lime or dolomite.

The latter emerge from the combustor as stream 52 and are fed to a screen separator 53. Larger chunks of slag are removed at 54. The calcined lime or dolomite 55 is split into two streams 56 and 57. The main stream 56 is recycled into the gasifier 29. A purging stream 57 goes into the Chance recovery system for recovery of the sulfur.

The combustor is operated at lower temperatures around 1500°–1800° F. near the flue-gas exit promoting the reduction reaction of char to reduce $NO_x$ emissions.

The flue gas leaves the combustor as stream 47. In the cyclone system 48 the fine solid particles are returned to the combustor via 49. The flue gas stream 50 passes through an after-burner (not shown) to remove the unburned carbon monoxide.

After passing through the sludge heater 32, the flue gas is fed to the $CO_2$ recovery train. After the removal of tar and $NH_4CO_3$ in scrubber 43, the product stream goes to hot $K_2CO_3$ scrubber 200 etc. where the $CO_2$ content of the product is reduced to about 2%. When the gas is used for chemical fuel synthesis, the $CO_2$ content can be further reduced to 25 ppm by extraction with monoethylamine.

The $H_2S$ and $CO_2$ free gas stream is fed into a "drying" section by scrubbing with diethylene glycol. The CO gas is separated in the COSORB section by a COSORB process (Chemical Engineering, 84 (26), pages 122–123, 1977) in which CO is removed by dissolution in a toluene solution of cuprous aluminum tetrachloride. The desorptions of the $CO_2$ and CO are both achieved by lowering the pressure and by heating in reboilers.

The extent of CO removal from the product gas depends on its end use. For example, if the product gas is used for home heating, the CO should be removed to the extent that any leakage from pipeline in homes will not cause any hazard. If it is to be used for organic synthesis, the CO removal is to adjust the CO to $H_2$ ratio to 1:2 for methanol synthesis and 1:3 for pipeline gas manufacturing. The excess purified CO can be used as raw material for the synthesis of acetic acid through reaction with methanol. The product gas, after removing it CO content, can be used as a raw material for liquid-fuel synthesis.

Figure 2:
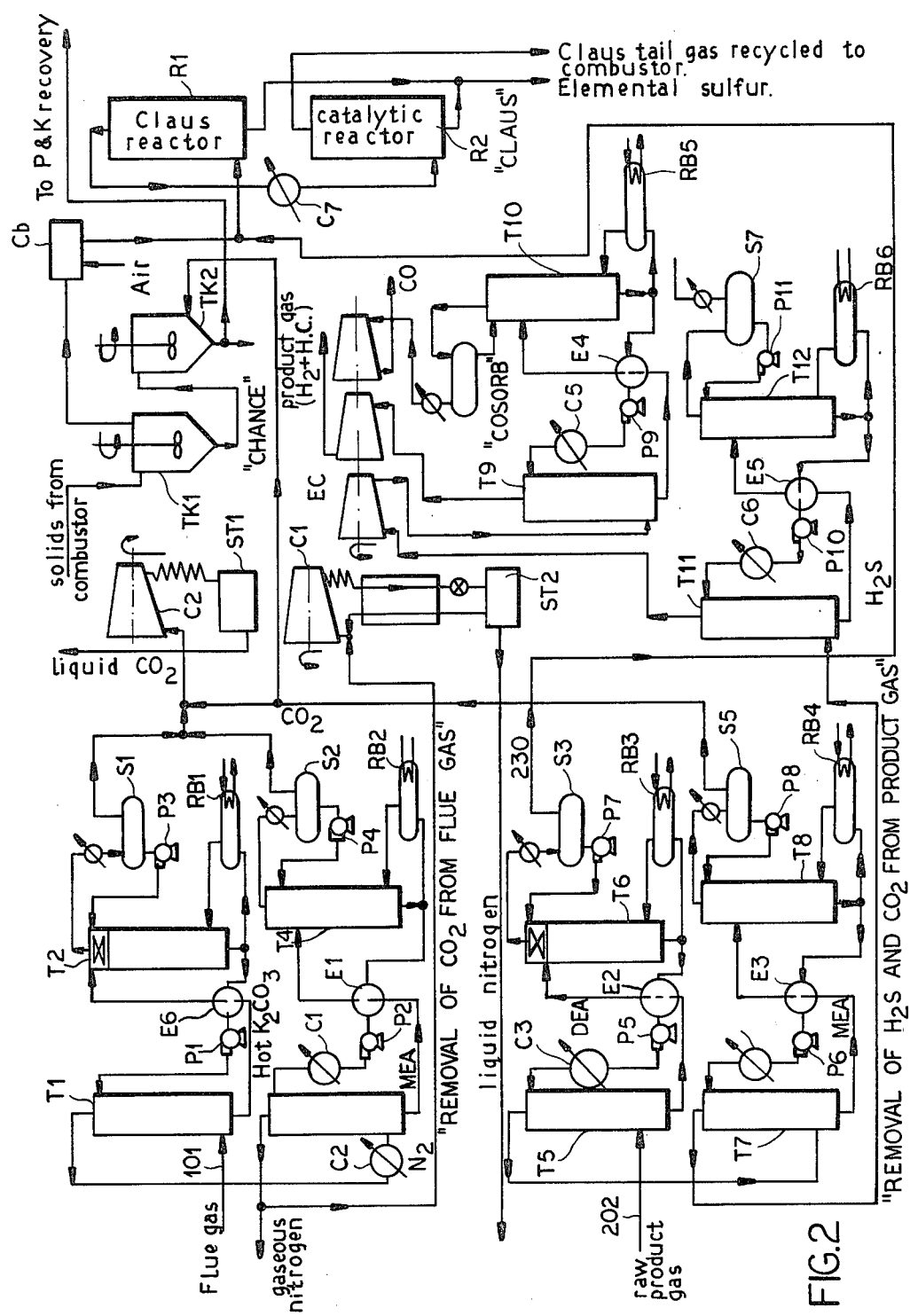
FIG. 2 is a flow diagram showing purification and separation stages indicated only in block diagram form in FIG. 1.

As shown in FIG. 2 the $CO_2$ from the product-gas purifying train and from the flue-gas train which consists of columns T5, T1, compressor C2 and a cooler, the liquified $CO_2$ is stored in $ST_1$ ready for shipping to oil fields for enhancing the tertiary recovery. The gaseous $CO_2$ is recycled back to the gasifier.

The purified nitrogen in gaseous or liquid form is sent to an ammonia plant for fertilizer synthesis.

SYSTEM FOR GAS PURIFICATION AND BYPRODUCT RECOVERY

The flue gas stream 101 enters absorber T1 where 98% of the $CO_2$ is removed by an aqueous solution of $K_2CO_3$ (30–40 wt%) at about 280° F. in absorber T2 to reduce the $CO_2$ content of the flue gas to 10–25 ppm leaving the latter essentially as pure nitrogen. Rich $K_2CO_3$ and MEA solutions are regenerated by heating in the heat exchanger E6 and E3 and stripping in towers T2 and T4 respectively.

The product gas from the gasifier comes into the purification section as stream 202. It is first scrubbed with diethylamine (DEA) to remove all $H_2S$ together with a small amount of $CO_2$ in tower T5. The rich DEA solution is preheated in heat exchanger E2 and stripped of its gas content in tower T6. The gas (mainly $H_2S$) separates from rich DEA solution in storage tank S3 and leaves as stream 230 which is led to Claus process section for sulfur recovery.

After being stripped of its $H_2S$ content, the product gas is depleted of its $CO_2$ content down to 10–25 ppm by scrubbing with aqueous solution of MEA in tower T7. The rich MEA solution is regenerated in tower T8. The $CO_2$ gas from storage tank S5 is combined with $CO_2$ recovered from the flue gas for further processing.

Now, the product contains only hydrogen, CO, $CH_4$ and some other hydrocarbons. It is first dried by scrubbing with diethylene glycol (DEG) in tower T11. The DEG stream 41 is regenerated in stripping tower T12. The water vapor is purged as stream 49. Then the product gas stream 40 is led into the COSORB process section where the gas mixture is compressed by an expander-compressor, EC, to several atmospheres. Then it is scrubbed with a toluene solution of cuprous aluminum tetrachloride in tower T9. The scrubbing solution is regenerated in tower T10. Both product gas (now contains only hydrogen and lower hydrocarbons) and pure CO pass through the expander. Both gases have a variety of uses.

Both $CO_2$ and nitrogen and liquefied for transport to remote destinations. If an ammonia synthesis plant is located nearby, the nitrogen can be pipelined to the plant site. The spent lime or dolomite is continuously purged from the combustor and is fed into the Chance process section where the spent lime or dolomite reacts with $CO_2$ and $H_2O$ to release $H_2S$ according to the following chemical equation:

$$CaS + CO_2 + H_2O \rightarrow CaCO_3 + H_2S$$

or

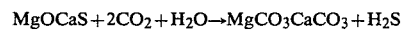

$$MgOCaS + 2CO_2 + H_2O \rightarrow MgCO_3CaCO_3 + H_2S$$

The $H_2S$ from the Chance Process is mixed with the $H_2S$ from the product purification section. Part of the $H_2S$ is burned in $C_b$ with air to form $SO_2$. The $SO_2$ to $H_2S$ in the feed to Claus thermal reactor R1 is close to 1:2. The temperature in R1 is around 2100° F. and the catalytic reactor is operated around 400–510° F. The catalyst used is bauxite or $\gamma$ aluminum. The sulfur is collected in a condenser (not shown) as slurry suspended in water. The tail gas from the Claus catalytic reactor is recycled back to the char combustor.

The spent aqueous slurry from the Chance reactor is separated in a thickener (not shown). The solid residual, after being dried, can be used for landfill, and the solution is sent to a set of evaporators and crystallizer processing section to recover the valuable soluble product such as phosphorus and potassium compounds.

SPECIFIC EXAMPLES

The composition of raw materials used for the integrated process shown in Table I.

TABLE I

| Raw Material Compositions | | | | |
|---|---|---|---|---|
| Pittsburgh Seam hvAb Coal | | Municipal Solid Waste | | Municipal Sludge |
| A. Proximate Analysis: | | Heating value = 5500 BTU/lb | | 3% dry solid content Heat value of undi- |
| Moisture | 1.2% | Moisture | 18.35% | gested solid for |
| Volatile matter | 36.4 | Combustible | 65.32% | volatiles = 10,300 |
| Fixed carbon | 56.7 | Inorganic | 16.33% | BTU/lb. [9] |
| Ash | 5.7 | | | (vs.5300 BTU/lb for digested solid) |
| B. Ultimate Analysis: | | | Composition of Inorganics: | |
| Carbon | 79.09% | Glass | 38.4% | Dry solid |
| Hydrogen | 5.22 | Rock and Dirt | 28.9 | analysis: [10] |
| Nitrogen | 1.60 | Ferrous | | Volatiles 44.2 |
| Sulfur | 1.10 | Metals | 26.9 | Ash 55.8 |

TABLE I-continued

Raw Material Compositions

| Pittsburgh Seam hvAb Coal | | Municipal Solid Waste | | Municipal Sludge | |
|---|---|---|---|---|---|
| Oxygen (by difference) | 7.22 | Aluminum Non-Ferrous | 3.9 | | |
| Ash | 5.77 | Metals | 1.9 | | |
| Total | 100% | | | | |

| Ultimate Analysis: | | Analysis of Ash: | |
|---|---|---|---|
| $H_2O$ = | 18.4% | $SiO_2$ | 48.1% |
| Ash = | 16.3 | $Al_2O_3$ | 13.1 |
| c | 36.5 | CaO | 21.7 |
| H | 4.5 | MgO | 2.1 |
| O | 24.2 | $K_3PO_4$ | 12.4 |
| N | 0.03 | | |
| S | 0.07 | Sulphate | 1.0 |
| | 100% | $Fe_2O_3$ | 8.8 |
| | | MnO | 0.3 |
| | | $P_bO$ | 0.3 |

| Proximate Analysis | |
|---|---|
| Moisture | 18.4% |
| Fixed Carbon | 27.7 |
| Volatile matter | 37.6 |
| Ash | 16.3 |

EXAMPLE 1

100 lbs/hr of municipal solid waste and 108.9 lbs/hr of Pittsburgh seam hvAb and 83.3 lb/hr of sludge with 97% water content were cogasified. The compositions of the three raw materials are shown in Table I. The calcined lime was circulated at a rate of 325 lbs/hr (40% excess). The gasifier was operated in the temperature range of 1200° F. to 1800° F. The solid exit end of the combustor was operated at 2000°-2400°. The air used was varied from stoichiometric values to about 15% excess in oxygen. The following products were obtained.

| Carbon monoxide gas | $5.76 \times 10^4$ cu.ft/day |
|---|---|
| Carbon Dioxide | 2270 lbs/day |
| Product gas | $8.1 \times 10^4$ cu.ft/day |
| Product gas composition | $H_2$, 87.2%; $CH_4$, 7.6%; $C_2-C_3$, 5.2% |
| Product gas heating value | 400-420 BTU/lb |
| Char, none | |
| Sulfur | 26 lbs/day |
| Aluminum and its alloy | 13 lbs/day |
| Ferrous metals | 95 lbs/day |
| Non-ferrous metals | 6 lbs/day |
| $NH_4CO_3$ | 170 lbs/day |
| Phosphates | 3.3 lbs/day |

EXAMPLE 2

100 lbs/hr of municipal waste, 150 lbs/hr of sludge (97% water content) and 211.7 lbs/hr of Pittsburgh seam hvAb coal were co-gasified. The compositions of the three raw materials are listed in Table 1. The circulation rate of calcined lime was 536 lbs/hr. The conditions for gasification and the combination were the same as in Example I. The products obtained were:

| Carbon dioxide | 3600 lbs/day |
|---|---|
| Carbon monoxide | $9.2 \times 10^4$ cu.ft/day or 7200 lbs/day |
| Product gas | $1.3 \times 10^5$ cu.ft/day |
| Product gas composition: | |
| $H_2$ | 87.3% |
| $CH_4$ | 7.8% |
| $C_2-C_3$ | 4.9% |
| Sulfur | 55 lbs/day |
| Aluminum and its alloy | 13 lbs/day |
| Ferrous metals | 95 lbs/day |

| -continued | |
|---|---|
| Non-ferrous metal | 6.7 lbs/day |
| $NH_4CO_3$ | 340 lbs/day |
| Phosphates | 10 lbs/day |

EXAMPLE 3

100 lbs/hr of shredded MSW of the composition shown in Example 1, were mixed with 169.5 lb per hr of ground lignite and 11.8 lb per hr. of sludge and was fed to the gasifier. The composition of lignite is shown below:

| Proximate Analysis | | Ultimate Analysis (dry basis) | |
|---|---|---|---|
| Moisture | 37% | Hydrogen | 4.45% |
| Volatile matter | 26.6% | Carbon | 64.23% |
| Fixed carbon | 32.2% | Nitrogen | 0.76% |
| Ash | 4.2% | Sulfur | 0.76% |
| High heating value | 7,255 BTU/lb | Oxygen (by difference) | 23.13 |
| | | Ash | 6.67% |

The lime (or dolomite) was recycled at the rate of 320 lb/hr. The horizontal rotating plug flow type reactor was operated at temperature from 1200° F. to 24° F. from one end to another.

| Carbon dioxide | 2,240 lbs/day |
|---|---|
| The products from the operation consisted of: | |
| CO gas, | $5.4 \times 10^4$ cu ft./day |
| Fuel gas, | $8.0 \times 10^4$ cu.ft./day |
| Fuel gas Composition: | |
| 85.5% $H_2$; 8.6% $CH_4$; 5.9% $C_2-C_4$ | |
| With a high heating value of approximately 420 BTU/cu.ft. | |
| High grade aluminum, | 6.9 lb/day |
| Aluminum Alloy, | 6.9 lb/day |
| Ferrous metals, | 95 lb/day |
| Non-ferrous metals, | 6.7 lb/day |
| $NH_4CO_3$, | 127 lb/day |
| Sulfur | 30 lb/day |

EXAMPLE 4

This example shows the co-gasification of coal of high fixed carbon and the undried water slurry of biomass. 100 lbs/hr of Pittsburgh seam hvAb was co-gasified with 112.4 lbs/hr of ground kelp in a water suspension which had 30% total solid content. The conditions of gasification of solids and combustion of residual char were the same as indicated in Examples 1 and 2. The circulation rate was kept at 258 lbs/hr (40% excess).

The following products were obtained:

| Carbon dioxide, | 1450 lbs/day |
|---|---|
| Carbon monoxide, | $3.5 \times 10^4$ cu.ft/day |
| Product gas | $6.0 \times 10^4$ cu.ft/day |
| Product gas composition: | |
| $H_2$ | 84% |
| $CH_4$ | 11% |
| $C_2-C_3$ | 4% |
| Sulfur | 23 lbs/day |
| $NH_4CO_3$ | 190 lbs/day |

The advantages of the system of the present invention are numerous. For example, the cost of recovering and recycling the carbon dioxide is compensated by sale of liquid carbon dioxide for use, for example, in tertiary crude oil recovery from subterranean oil reservoirs. Since the gasifier can be provided with a worm which also acts as the carbon dioxide distributor, because the $CO_2$ is fed through the shaft of the worm, it acts as an integrated dryer and pyrolyzer for the MSW and coal, as a vaporizer for the wet biomass, and sludge, and as the gasifier for the char and carbon-containing components.

In addition, liabilities in conventional processes are turned into credits with the system of the present invention in several ways. For example, the water content of sludge or wet biomass or the moisture content of coal may be detrimental in other processes because the products must be dried before effective use. In the integrated system of the present invention, however, this water or moisture contributes to the steam/char reaction and thus eliminates the need to supply an equivalent amount of natural water.

Naturally, the system represents a major advance in environmental protection by eliminating the disposal of MSW and sludge in an uneconomical fashion. Practically no nitrogen oxides are released into the atmosphere and the gas purification costs are covered by the utilization of the several products including sulfur which is supplied to the Claus process and products which are utilized in fertilizer and the like. The recovery of aluminum, frequently a problem in the handling of MSW, represents an economic bonus.

Mention should be also made of the fact that the pretreatment of MSW and the separation of various components therefrom does not add to the overall cost because the recovery of ferrous metals and nonferrous metals permits use of these materials and hence covers the cost of separation.

Finally, it should be apparent that the system of the invention utilizes effectively a combination of coal with other carbon-containing materials so that seasonal variations in the nature and quantity of MSW can always be compensated by, for example, increasing or decreasing the coal quantity utilized. As a result, the method is highly efficient and versatile.

I claim:

1. A method of gasifying water and a carbon-containing substance consisting of coal alone or coal together with municipal waste, sewage sludge or another biomass which comprises the steps of:
   (a) pyrolyzing said carbon-containing substance by contacting it with hot CaO in the form of calcined lime or dolomite, thereby producing a solid phase containing CaO, $CaCO_3$ and char, and a gaseous phase containing $CO_2$, $H_2O$, CO, $H_2$ and hydrocarbons;
   (b) reacting water from a source other than step (a) with said char in said solid phase in a steam-carbon reaction energetically promoted by concurrently reacting $CO_2$ with said CaO to form $CaCO_3$ and the heat necessary to drive the steam-carbon reaction, thereby producing a combustible-containing solid residue which also includes $CaCO_3$, and a gas containing $CO_2$, CO, $H_2$ and hydrocarbons;
   (c) removing $CO_2$ which remains unreacted with CaO from the gas produced in step (b) and recycling at least a portion of the removed $CO_2$ back to step (b);
   (d) combusting the residue produced in step (b) and transforming the $CaCO_3$ thereof to CaO and carbon dioxide, the steam-carbon reaction of step (b) being controlled so that residual char in said solid residue will upon combustion in step (d) produce sufficient heat to completely decompose the $CaCO_3$;
   (e) recycling the CaO from step (d) to step (a);
   (f) recovering at least a major portion of the gas from step (c) after removal of $CO_2$ to form a product gas; and
   (g) recovering $CO_2$ from flue gas obtained from step (d) and sending part of it back to step (b).

2. The method defined in claim 1 wherein said carbon-containing substance consists of coal and a municipal solid waste fraction derived by comminuting municipal solid waste and separating said fraction as a light component from the remainder of the comminuted waste, both said coal and said fraction being pyrolyzed in step (a).

3. The method defined in claim 2 wherein said municipal solid waste fraction contains aluminum and steps (a) and (b) are carried out in a single vessel forming a gasifier, said method further comprising the steps of melting aluminum in said vessel and tapping molten aluminum from said vessel.

4. The method defined in claim 1, claim 2 or claim 3 wherein the water introduced in step (b) is supplied to step (b) in the form of natural water, wet biomass or a sewage sludge, combustibles in said sludge or biomass undergoing pyrolysis and forming part of said char.

5. The method defined in claim 4 further comprising the step of preheating said natural water, wet biomass or said sludge prior to introducing it into step (b) with a hot flue gas derived from the combustion of step (d).

6. The method defined in claim 5, further comprising the step of heating said natural water, wet biomass or said sludge prior to the preheating thereof with said flue gas, with the gas produced in step (b) prior to the removal of $CO_2$ therefrom in step (c).

7. A method of gasifying water and a plurality of carbon-containing substances including coal, and municipal waste or sewage sludge or another biomass and wherein n carbon-containing substances are used, said method comprising the steps of:
   (a) pyrolyzing said carbon-containing substances by contacting them with hot CaO in the form of calcined lime or dolomite, thereby producing a solid phase containing CaO, $CaCO_3$ and char, and a gaseous phase containing $CO_2$, $H_2O$, CO, $H_2$ and hydrocarbons;
   (b) reacting water from a source other than step (a) with said char in said solid phase in a steam-carbon reaction energetically promoted by concurrently reacting $CO_2$ with said CaO to form $CaCO_3$ and the heat necessary to drive the steam-carbon reaction, thereby producing a combustion-containing solid residue which also includes $CaCO_3$, and a gas containing $CO_2$, CO, $H_2$ and hydrocarbons;
   (c) removing $CO_2$ which remains unreacted with CaO from the gas produced in step (b) and recycling at least a portion of the removed $CO_2$ back to step (b);
   (d) combusting residue produced in step (b) and transforming the $CaCO_3$ thereof to CaO and carbon dioxide, the steam-carbon reaction of step (b) being controlled so that residual char in said solid residue will upon combustion in step (d) produce sufficient heat to completely decompose the $CaCO_3$;
   (e) maintaining the balance of the components fed to step (a) such that it is defined by the relationship:

$$\sum_{i=1}^{n} \Delta Hc(x_i - y_i) = \sum_{i=1}^{n} \Delta Hl\, y_i$$

where
- $x_i$ = mole fraction of fixed carbon content for the $i^{th}$ component,
- $y_i$ = mole fraction of water content for the $i^{th}$ feed component,
- $\Delta Hc$ = heat of combustion of carbon in BTU/lb mole or Kcal/g mole,
- $\Delta Hl$ = heat of steam-carbon reaction in BTU/lb mole or Kcal/g mole, and
- $i$ = stands for an individual feed component, including coal municipal solid waste, sewage sludge, and other biomass;

(f) recycling the CaO from step (d) to step (a);

(g) recovering at least a major portion of the gas from step (c) after removal of $CO_2$ to form a product gas, and (h) recovering $CO_2$ from flue gas obtained from step (d) and sending part of it back to step (b).